May 16, 1933. O. P. NYSTROM 1,909,309
ADJUSTABLE ELBOW
Filed Feb. 16, 1931

Inventor
Oscar P. Nystrom
By Lurance and
Van Antwerp
Attorneys

Patented May 16, 1933

1,909,309

UNITED STATES PATENT OFFICE

OSCAR P. NYSTROM, OF HOLLAND, MICHIGAN, ASSIGNOR TO HOLLAND FURNACE COMPANY, OF HOLLAND, MICHIGAN, A CORPORATION OF MICHIGAN

ADJUSTABLE ELBOW

Application filed February 16, 1931. Serial No. 516,142.

This invention relates generally to sheet metal construction and more particularly to an adjustable elbow.

Previous to my invention considerable difficulty has been encountered in the installation of sheet metal pipes or conduits for carrying air and the like as the size and bulkiness of the relatively large sheet metal pipes, as well as their rather weak construction, precludes exact and strictly alined installations, and hence it is usually necessary to bend and flex the adjacent pipes and conduits so that the usual overlapping engagement may be had therebetween. The usual installation of the above character occurs without accurate floor and elevation plans and oftentimes without any plans at all. In both of these cases it is advantageous to have adjustable fittings whereby installation may be accordingly simplified.

One of the principal aims of my invention is to inventively create an elbow which may be readily adjusted to the desired angle during its installation, thus eliminating fitting and trying of the same, with a consequent decrease in labor and cost. In other words, there is no need to attempt to estimate the desired elbow for a particular joint but one can simply fasten one arm of my novel elbow unit in place and then bend the other arm so as to obtain an exact and perfect fit.

Another advantage of my construction lies in its cheap construction, such, obviously, being necessary in this day and age. My device consists of only two main parts and hence is inherently cheap to manufacture although of sturdy construction.

Further objects and advantages will become apparent as the said invention is hereinafter further disclosed.

Figure 1:
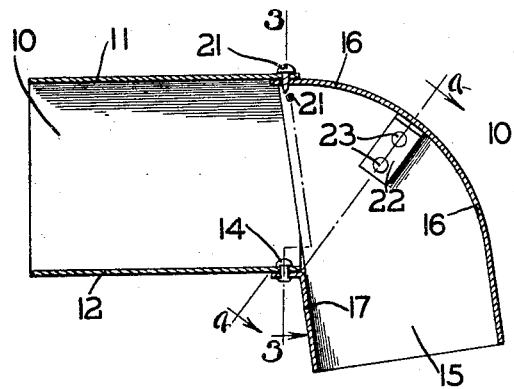
Fig. 1 is a cross sectional view taken along the plane of line 1—1 of Fig. 3.
Figure 3:
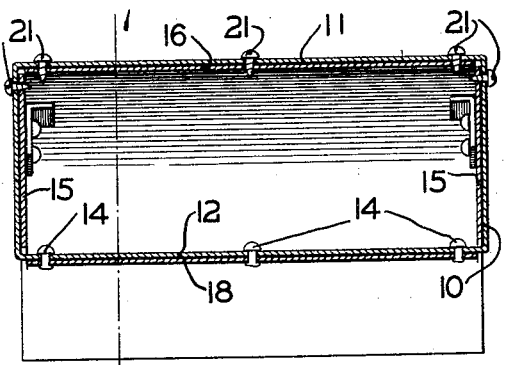
Fig. 3 is a view in cross section taken along the line 3—3 of Fig. 1.

In the drawing, 10 designates the side plates, 11 the top plate, and 12 the bottom plate of the straight arm of my novel elbow. This straight arm is of rectangular cross section, as clearly shown in the drawing, and will hereinafter be referred to as the fixed arm in order to distinguish it from the movable conduit or arm which is adjustably attached thereto. The bottom plate 12 has a series of holes 13 adjacent one edge thereof through which rivets 14 pass.

Figure 5:
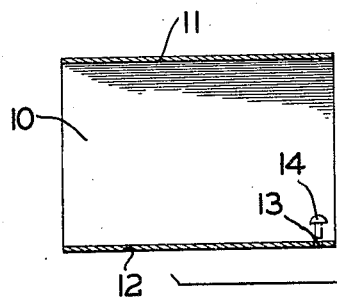
Fig. 5 is a view showing the several parts of the elbow in disassembled relationship.
Figure 5:
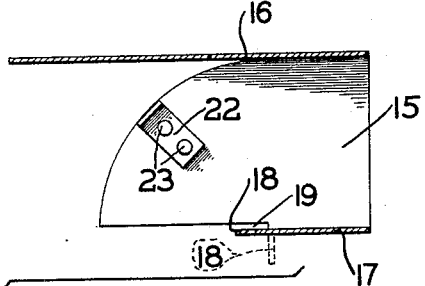

The movable part or arm of the elbow has side portions or plates 15, each terminating in an arced forward edge, see Fig. 5, a top plate 16, and a lower plate 17, said lower plate having a flap or portion 18 integral therewith. The flap 18 has holes 19 formed therein and the rivets 14 pass through these holes and are riveted over thus connecting the two arms together.

Figure 2:
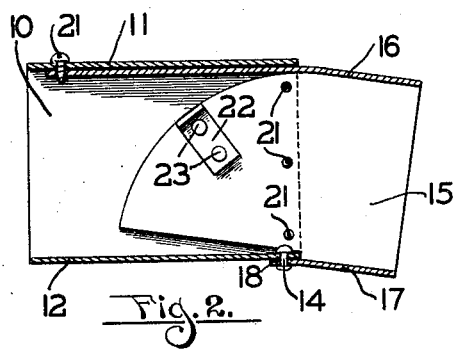
Fig. 2 is a view similar to Fig. 1 but showing the two arms of the elbow in different angular position with respect to each other.
Figure 4:
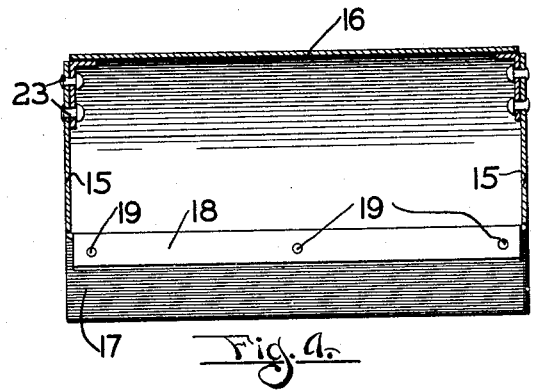
Fig. 4 is a view taken along the line 5—5 of Fig. 1.

One position of the arms is indicated in Fig. 2 and metal screws 21 are driven through the side plates 10 and 15 to maintain the movable arm in fixed position relative to the other arm. A screw is also inserted between the plates 11 and 16 as shown.

The side plates 15 support the brackets 22 which are held thereto by the rivets 23. The inturned portion of each bracket rides under and supports the free end portion of the top plate 16 as the movable arm is rotated to a considerable angle with respect to the fixed arm. See Fig. 1. The juncture between the flap 18 and the bottom plate 17 serves as a hinge as shown in the drawing. After the arms are positioned relative to each as desired, metal fastening screws 21 are located between the top plates 11 and 16 whereby the two parts of the elbow are permanently held in position.

The operation is readily understood. The fixed arm is located in its permanent position and then the movable arm is bent to its chosen position. The flap or flange 18 bends during this manipulation. Also, the free end portion of the top plate member 16 cams or rides against the inner side of the top plate 11 and the abutting of the brackets against the inner face of the top plate member 16 prevents it from bowing inwardly. After the several parts are in the position desired, holes are punched through the contacting plates in the desired positions and screws are driven therethrough thus securing the arms securely. Asbestos paper or insulating coating is now applied to the outside of the elbow in the usual manner and thus an efficient installation is obtained.

Having thus described my invention I desire it to be understood that the invention is in no wise limited to the particular illustrative embodiment disclosed, the scope thereof being set forth in the following claims.

I claim:

1. An article of manufacture of the character described comprising a hollow member having a rectangular shaped cross section, another hollow member having a bottom plate, side plates and a top plate, said bottom plate having a depending bendable flap riveted to the first mentioned hollow member whereby the members are connected together, said top plate having a free portion adapted to frictionally engage interiorly of the first mentioned hollow member.

2. An article of manufacture of the character described comprising two members of similar and hollow cross section whereby one may fit inside of the other, a flap depending from one of said members, and means for fastening the said flap rigidly to the other member whereby the members may be positioned relatively to each other by bending of the flap during such manipulation, the member having the flap also having side walls and a top wall, the side walls being curved in a circumference about the flap whereby they freely and snugly enter the member not having the flap thereon.

3. An elbow of the class described comprising a hollow arm, another hollow arm attached thereto, said arms being movable relative to each other by a relatively large strain whereby distortion of one of the arms is had, one arm also having a portion thereof frictionally engaging interiorly of the first mentioned arm whereby the two arms are held in their adjusted position, said distortion also tending to maintain the arms in their adjusted position.

4. An elbow of the class described consisting of two telescoping members adapted to be turned at an angle to each other and hinge means therebetween, said hinge means comprising a sheet metal flap integral with one of the members and fastened rigidly to the other of the members.

5. An article of manufacture of the character described comprising a hollow member having a rectangular shaped cross section, another hollow member having a bottom plate, side plates and a top plate, said bottom plate having a depending means connected onto the first mentioned hollow member whereby the members are movably connected together, said top plate having a free portion adapted to engage interiorly of the first mentioned hollow member, and bracket means rigidly connected to the inner side plates of the second mentioned hollow member to prevent excessive inward movement of the said free portion of the said top plate.

In testimony whereof I affix my signature.

OSCAR P. NYSTROM.